United States Patent Office 2,816,887
Patented Dec. 17, 1957

2,816,887

LOWER FATTY ACID ACYLATION OF CELLULOSE AND CATALYST THEREFOR

Bayard T. Lamborn, Matawan, N. J., assignor to Hercules Powder Company, Wilmington, Del., a corporation of Delaware No Drawing. Application April 3, 1953
Serial No. 346,802

4 Claims. (Cl. 260—227)

This invention relates in general to the preparation of a cellulose derivative and in particular to a process and catalyst for the acylation of cellulosic material containing replaceable hydroxyl groups.

In processes for acylation of cellulose such as, for example, the preparation of cellulose acetate or the like, it is usual to carry out the acylation reaction in the presence of an acid catalyst. Thus, in the conventional process for preparing cellulose acetate, generally comprising reacting cellulose with an acylation agent such as acetic anhydride, it has been found that this acylation reaction is catalyzed by a strong acid, and further it has been found that the selection of the catalyst has a striking effect on the reaction rate. Previously, sulfuric acid has been the catalyst of choice since it promotes a reaction rate quick enough to be economically practical and at the same time slow enough to be subject to suitable process control. Unfortunately, however, the use of sulfuric acid as a catalyst for this reaction is undesirable inasmuch as it tends to produce a cellulose ester which is characterized by containing significant amounts of chemically bound sulfates which, unless substantially all removed during subsequent hydrolysis and washing treatments, promote instability and decomposition of the product. It is well known that it is difficult and tedious to remove such chemically bound sulfates to a degree sufficient to assure satisfactory stability.

In order to avoid this combined sulfate contamination, alternative catalysts have been proposed, but these have not been entirely satisfactory. Zinc chloride in relatively large amounts (25–50% by weight based on the cellulose) together with application of heat effects reaction, but the rate of reaction is excessively slow, requiring from 24 to 48 hours or even longer, and the product obtained is usually nonhomogeneous and exhibits poor solubility characteristics. Hydrochloric acid and mixtures of hydrochloric acid and zinc chloride exhibit similar faults, i. e., low catalytic activity with attendant slow reaction rate, and nonhomogeneity of product. Various sulfonic acids likewise exhibit very low catalytic activity, so low in fact that the acylation reaction usually does not go to completion, and the products are nonhomogeneous and of poor solubility characteristics. Various salts of perchloric acid such as the alkali metal perchlorates, magnesium perchlorate and zinc perchlorate have likewise been proposed as acylation catalysts, but these exhibit the same faults as the sulfonic acids, i. e., very low catalytic activity and the products are similarly nonhomogeneous and of poor solubility characteristics. It has also been proposed to use mixtures of certain metal perchlorates with a mineral acid, for example, sodium perchlorate with phosphoric acid. A principal difficulty with such mixtures is that the mineral acid component is objectionable for one reason or another. For example, acids like hydrochloric or hydrobromic and their salts are highly corrosive. Hence, during subsequent hydrolysis and purification of the cellulose ester, and in recovery of acetic acid or other aliphatic acid these hydrohalide acids or their by-product salts corrosively attack the equipment. Sulfuric acid, of course, and nitric acid as well, are combining-type catalysts and are objectionable from this standpoint, as pointed out hereinbefore, for sulfuric acid. Phosphoric acid is objectionable because it tends to form insoluble phosphate salts during subsequent hydrolysis and purification treatments, which salts impart haze to the finished product because of the difficulty in washing out such insoluble phosphates in the purification of the product.

Now in accordance with the present invention, cellulosic material, such as cellulose and cellulose ethers, containing replaceable hydroxyl groups is acylated in the presence of noncombining acylation catalyst consisting essentially of mixtures of at least one metal perchlorate and at least one sulfonic acid, the metal of said metal perchlorate having an electrode potential between about +1.7 and about −0.7.

Acylation reactions carried out in the presence of the mixed catalysts of this invention proceed rapidly, uniformly and without violence to completion, and are subject to complete control and regulation throughout their course. This is quite surprising when it is realized that neither metal perchlorates alone nor sulfonic acids alone are satisfactory acylation catalysts, both classes being extremely low in catalytic activity, being so low in fact that in most instances the acylation reaction usually does not go to completion. Hence, it is evident that the catalyst mixtures of this invention are synergistic in their catalytic behavior. Moreover, the catalysts of this invention exhibit other distinct advantages over previously proposed catalysts in that they, or by-product salts derived therefrom, do not corrosively attack equipment during hydrolysis and purification treatments, or the recovery systems for recovering the weak aqueous acids resulting from the manufacture of cellulose organic esters. Furthermore, by-product salts which are formed during the manufacturing process are sufficiently soluble in water so that they are readily removed during purification, and hence do not contribute to haze formation in the finished products.

The general nature of the invention having been set forth hereinabove, the following examples are given in illustration but not in limitation of preferred procedures within the scope of the invention.

EXAMPLE 1

A pretreated cellulose mix was prepared by spraying 30 parts by weight of cotton linters with 10.5 parts by volume of glacial acetic acid and the resulting product after overnight storage was placed in a suitable reaction vessel. An acylation mix was separately prepared by mixing together 78 parts by volume of acetic anhydride, 110 parts by volume of methylene chloride, 0.1 part by weight of zinc perchlorate, and 0.145 part by weight of p-toluenesulfonic acid. This acylation mix was then poured into the reaction vessel containing the pretreated cotton linters and the mass was thoroughly agitated with external cooling for about one-half hour to maintain a temperature of about 20° C., after which the temperature of the reaction vessel was raised to about 40°–45° C. and maintained within this temperature range for the remainder of the acylation reaction. The acylation reaction proceeded uniformly, and was subject to complete control throughout its course. In order to permit comparison between acylation catalysts, there was selected as an arbitrary reaction end point that point in the reaction where a substantially fiber-free acylation dope was first produced. At the end of 3½ hours' reaction period, the reaction was judged to be satisfactorily complete in that a fiber-free acylation dope was produced, and the product after hydrolysis and washing was a cellulose acetate with satisfactory viscosity, uniformity and stability.

In a similar reaction procedure, identical except that zinc perchlorate was employed as the sole catalyst, the acylation reaction was exceedingly slow. A dope started to form after 24 hours. However, after 48 hours the dope was still full of numerous unreacted cellulose fibers, and the reaction was deemed to be unsatisfactory.

In a second similar reaction procedure, identical except that p-toluenesulfonic acid was employed as the sole catalyst, the acylation reaction did not proceed at all satisfactorily. In fact, after 13¼ hours there was no evidence of any appreciable reaction, and the cellulose had the same wetted appearance as at the start.

The results of these three acylations, summarized below, shows clearly the superior behavior of the mixed catalyst of this invention over either of the components employed alone as catalyst.

| | |
|---|---|
| Zinc perchlorate mixed with p-toluenesulfonic acid. | Smooth and rapid acylation complete in 3½ hours. |
| Zinc perchlorate alone | Acylation incomplete after 48 hours. |
| p-Toluenesulfonic acid alone | No evidence of reaction after 13¼ hours. |

EXAMPLE 2

Following substantially the same procedure set forth in Example 1, similar reactions were performed utilizing as the acylation catalyst 0.1 part by weight zinc perchlorate mixed with 0.152 part by weight of 79% sulfoacetic acid, 0.1 part by weight zinc perchlorate mixed with 0.177 part by weight of 82.6% chlorosulfoacetic acid, and 0.1 part by weight zinc perchlorate mixed with 0.091 part by weight of 93% mixed alkane sulfonic acids. The results of these acylation procedures in all cases were the production of satisfactory cellulose acetate having good uniformity and stability at the end of a reasonable reaction period as set forth in Table 1 following. The acylation reaction in every case proceeded uniformly, and was subject to complete control throughout its course.

Table 1

| Example | Acylation reaction | Catalyst components | Reaction time at 40°–45° C., hours |
|---|---|---|---|
| 2 | Acetylation | 0.1 part by weight zinc perchlorate; 0.152 part by weight of 79% sulfoacetic acid. | 3 |
| 2 | do | 0.1 part by weight zinc perchlorate; 0.177 part by weight of 82.6% chlorosulfoacetic acid. | 3 |
| 2 | do | 0.1 part by weight zinc perchlorate; 0.091 part by weight of 93% mixed alkane sulfonic acids containing a mixture of methane-, ethane-, and propane-sulfonic acids and having a molecular weight of 110. | 21 |

EXAMPLE 3

Following substantially the same procedure set forth in Example 1, similar reactions were performed utilizing as the acylation catalyst 0.18 part by weight aluminum perchlorate mixed with 0.21 part by weight p-toluenesulfonic acid, 0.14 part by weight cobalt perchlorate mixed with 0.14 part by weight p-toluenesulfonic acid, and 0.10 part by weight cupric perchlorate mixed with 0.07 part by weight p-toluenesulfonic acid. The results of these acylation procedures in all cases were the production of satisfactory cellulose acetate having good uniformity and stability at the end of a reasonable reaction period as set forth in Table 2 following. The acylation reaction in every case proceeded uniformly, and was subject to complete control throughout its course.

Table 2

| Example | Acylation reaction | Catalyst components | Reaction time at 40°–45° C., hours |
|---|---|---|---|
| 3 | Acetylation | 0.18 part by weight $Al(ClO_4)_3 \cdot 9H_2O$; 0.21 part by weight p-toluenesulfonic acid. | 1½ |
| 3 | do | 0.14 part by weight $Co(ClO_4)_2 \cdot 6H_2O$; 0.14 part by weight p-toluenesulfonic acid. | 3 |
| 3 | do | 0.10 part by weight $Cu(ClO_4)_2 \cdot 6H_2O$; 0.07 part by weight p-toluenesulfonic acid. | 13 |

EXAMPLE 4

A pretreated cellulose mix was prepared by treating 30 parts by weight of cotton linters with 23 parts by weight of propionic acid and storing overnight. An acylation mix was separately prepared by mixing together 110 parts by volume of propionic acid, 113 parts by volume of propionic anhydride, 0.3 part by weight zinc perchlorate and 0.42 part by weight p-toluenesulfonic acid. The acylation mix was then added at about room temperature to the pretreated cellulose in a suitable reaction vessel provided with water-cooling facilities. The reaction mixture increased in temperature to about 29° C. over a 15-minute period, during which time the reaction vessel was cooled. The reaction vessel and contents were then heated to about 40° C. and maintained at this temperature for the remainder of the reaction. The acylation reaction proceeded uniformly, and was subjected to complete control throughout its course. The acylation was judged to be satisfactorily complete after 4 hours as evidenced by the formation of a substantially fiber-free cellulose ester dope, and a cellulose propionate having good uniformity and viscosity was obtained.

The general reaction contemplated according to this invention is the acid-catalyzed acylation of cellulose, for example, to introduce into the cellulose molecule acyl radicals such as acetyl, propionyl, butyryl, caproyl, stearyl, crotonyl, phthalyl, sorboyl, and the like, to produce single esters, or a mixture of acyl radicals such as acetyl propionyl, acetyl butyryl, acetyl stearyl, acetyl crotonyl, acetyl sorboyl, propionyl sorboyl, acetyl phthalyl, butyryl stearyl, and the like, to produce mixed esters. Similarly, the acid-catalyzed acylation of cellulose ethers containing replaceable hydroxyl groups, to introduce into such cellulose ethers various acyl radicals such as acetyl, propionyl, butyryl, caproyl, stearyl, crotonyl, phthalyl, sorboyl, and the like, to produce mixed ether-esters such as ethyl cellulose acetate, hydroxyethyl cellulose acetate, carboxymethyl cellulose acetate, methyl cellulose stearate, allyl cellulose acetate, benzyl cellulose acetate, hydroxyethyl cellulose propionate, and the like is likewise within the scope of this invention. Thus, it is apparent that the present invention embraces any acid-catalyzed acylation involving cellulosic material containing hydroxyl groups which are replaceable by acyl groups. The acylating reagent in all cases is generally the desired acid anhydride or anhydrides, or mixed anhydrous acid-acid anhydride.

As the cellulosic raw material, there is utilized any suitable and available cellulose source such as cellulose in any form, wood or wood pulp, cotton, cotton linters, regenerated cellulose, chemical cellulose, and other sources of cellulose, in either the raw or purified state, cellulose ethers containing replaceable hydroxyl groups, and the like, as desired.

The catalysts of this invention are mixtures of at least one metal perchlorate, the metal radical of which has an electrode potential between about +1.7 and about −0.7 (Handbook of Chemistry and Physics, 30th edition, page 1439), and at least one sulfonic acid. Thus, suitable perchlorates include those of aluminum whose electrode potential is about +1.7 zinc (+0.76), cobalt (+0.28), copper (−0.34), as well as other metals lying within this range. It is important that the electrode potential of the metal radical of the perchlorate component of the catalyst mixtures of this invention be within the range between about +1.7 and about −0.7. Such mixtures have sufficient catalytic activity to promote acylation reactions uniformly and smoothly to completion within reasonable reaction times and subject to complete control throughout. On the other hand, catalyst mixtures containing perchlorates of metals whose potentials are substantially higher than the range set forth herein are characterized by sluggish or no catalytic activity. Furthermore, catalyst mixtures containing perchlorates of metals whose potentials are significantly below the range set forth are characterized by excessive catalytic activity so that the acylation reaction becomes excessively fast and therefore difficult to control, with the result that nonhomogeneous products are obtained.

Any sulfonic acid is suitable in accordance with this invention, such as, for example, alkane sulfonic acids, mixed alkane sulfonic acids, methane sulfonic, ethane sulfonic, propane sulfonic, hexane sulfonic, ethionic, and the like, aromatic sulfonic acids, benzene sulfonic, toluenesulfonic, xylene sulfonic, naphthalene sulfonic, and the like, cycloaliphatic sulfonic acids such as cyclohexane sulfonic acid, substituted sulfonic acids including chloromethane sulfonic, bromoethane sulfonic, sulfoacetic, chlorosulfoacetic, and the like.

It is within the scope of this invention to employ one or more suitable metal perchlorates as hereinbefore set forth and one or more sulfonic acids, in any combination as desired, in preparing suitable catalyst mixtures. By way of example, suitable catalyst mixtures are prepared with a single metal perchlorate and a single sulfonic acid, such as mixtures of zinc perchlorate and p-toluenesulfonic acid, or with two or more suitable perchlorates and a single sulfonic acid, such as mixtures of aluminum and zinc perchlorates with benzenesulfonic acid, or with two or more suitable perchlorates with two or more sulfonic acids, such as mixtures of zinc and aluminum perchlorates with mixtures of benzene- and toluene-sulfonic acids, or with a single metal perchlorate and two or more sulfonic acids. Such a mixture is illustrated in Example 2 wherein zinc perchlorate and a mixed alkane sulfonic acid containing methane-, ethane-, and propane-sulfonic acids are mixed together to produce the acylation catalyst.

The activity of the catalyst mixtures depends at least in part on the selection of components and also at least in part on the proportions of the components. Thus, when aluminum perchlorate is selected, the catalytic activity of the mixed catalyst is more pronounced than when cupric perchlorate is employed. For this reason, among others, the proportions and amounts of the components employed in the mixed catalyst can be varied over a considerable range to suit the particular acylation conditions desired. It has been found that a total catalyst of about ¼% to about 8%, based on the weight of cellulose, may be employed, with a preferred amount between about ½% and about 3%; likewise, the ratio of perchlorate salt to sulfonic acid may be varied between about 9:1 and 1:9. Preferably, however, the amounts of the perchlorate salt and sulfonic acid components will be approximately stoichiometrically equivalent in the catalyst mixtures.

It has been found that the catalyst mixtures of this invention are noncombining in character, i. e. the catalysts of this invention do not combine chemically with cellulose in the manner in which sulfuric and nitric acids combine with cellulose. Moreover, the catalyst mixtures of this invention are substantially anhydrous compositions because of the substantially anhydrous character of the acylation mixtures in which they are employed. Small amounts of water which may be associated initially with the components of the catalyst mixtures, such as, for example, the water of hydration of perchlorate salts are immediately consumed in converting an equivalent quantity of the acid anhydride used as the acylating agent into the corresponding anhydrous acid.

As will be apparent to those skilled in the art, the new catalysts of this invention offer not only freedom from objectionable features of the prior catalysts, but in addition afford wide flexibility of control. When utilizing these catalysts, reactants of widely different inherent activity may be employed without necessitating procedural changes. Thus, for example, by adjustments in catalyst composition, a preferred reaction rate may be attained with various different acylating agents such as, for example, acetic anhydride, propionic anhydride, and the like.

The acylation reaction according to this invention may be carried out in any desired and appropriate medium as will be apparent to those skilled in the art. Thus, for example, it is presently preferred to carry out this acylation reaction under substantially anhydrous conditions and in the presence of suitable organic solvents. When a substantially fully acylated cellulose acetate is desired, it is presently preferred to include in the reaction mixture a suitable solvent for cellulose triacetate such as, for example, methylene chloride or the like, thus obtaining a smooth, substantially nongelling cellulose acetate dope. On the other hand, when the present invention is utilized for the preparation of a cellulose ester having higher acyl groups and the like therein, the cellulose ester produced frequently is soluble in the acylating composition and, accordingly, an auxiliary solvent is not desired. These and other adjustments of the reaction medium will be within the ability of those skilled in the art and may be made without departure from the spirit and scope of the present invention. It is, of course, obvious that fibrous acylation reactions, including both partial acylation of the replaceable hydroxyl groups in the cellulosic material as well as complete acylation of the replaceable hydroxyl groups therein, wherein the cellulose ester formed during the acylation reaction remains undissolved and in the same particulate or fibrous form as the starting cellulosic material throughout the reaction, come within the scope of this invention.

This is a continuation-in-part of my application Serial No. 181,317, filed on August 24, 1950, which in turn is a continuation-in-part of my application Serial No. 79,917, filed on March 5, 1949, and which is now abandoned.

What I claim and desire to protect by Letters Patent is:

1. In a process for the preparation of lower fatty acid esters of cellulose, the improvement comprising reacting cellulose with a mixture of anhydrous lower fatty acid and lower fatty acid anhydride in the presence of a catalytic amount of about ¼% to about 8%, based on said cellulose, of noncombining acylation catalyst consisting essentially of mixtures of zinc perchlorate and p-toluenesulfonic acid, the ratio of p-toluenesulfonic acid to zinc perchlorate being between about 9 to 1 and about 1 to 9 by weight.

2. In a process for the acetylation of cellulose, the improvement comprising reacting cellulose with a mixture of anhydrous acetic acid and acetic anhydride in the presence of a catalytic amount of about ¼% to about 8%, based on said cellulose of noncombining acylation catalyst consisting essentially of mixtures of zinc perchlorate and p-toluenesulfonic acid, the ratio of p-toluenesulfonic acid to zinc perchlorate being between about 9 to 1 and about 1 to 9 by weight.

3. In a process for the propionylation of cellulose, the improvement comprising reacting cellulose with a mixture of anhydrous propionic acid and propionic anhydride in the presence of a catalytic amount of about ¼% to about 8%, based on said cellulose of noncombining acylation catalyst consisting essentially of mixtures of zinc perchlorate and p-toluenesulfonic acid, the ratio of p-toluenesulfonic acid to zinc perchlorate being between about 9 to 1 and about 1 to 9 by weight.

4. As an acylation catalyst, a substantially anhydrous composition consisting essentially of mixtures of zinc perchlorate and p-toluenesulfonic acid, the ratio of p-toluenesulfonic acid to zinc perchlorate being between about 9 to 1 and about 1 to 9 by weight.

References Cited in the file of this patent

UNITED STATES PATENTS

| | | |
|---|---|---|
| 1,466,329 | Bassett | Aug. 28, 1933 |
| 2,024,381 | Muller | Dec. 17, 1935 |
| 2,031,657 | Jones | Feb. 25, 1936 |
| 2,103,012 | Muller | Dec. 21, 1937 |